Figure 1:
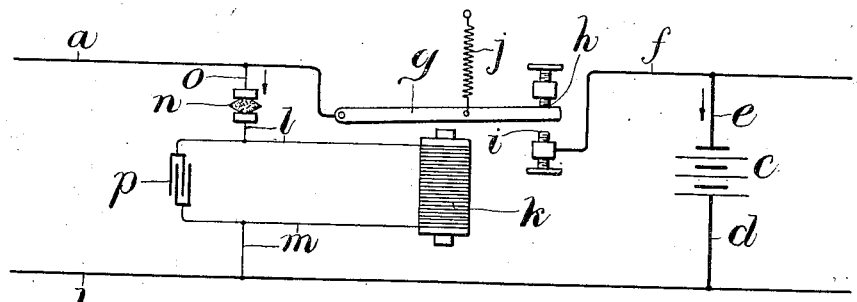

G. W. PIERCE.
RECTIFIER.
APPLICATION FILED FEB. 20, 1907.

923,700.

Patented June 1, 1909.

Witnesses:
Geo. N. Goddard
Katharine A. Dugan

Inventor:
George W. Pierce
by
Ira L. Fish
Attorney.

UNITED STATES PATENT OFFICE.

GEORGE W. PIERCE, OF CAMBRIDGE, MASSACHUSETTS, ASSIGNOR TO MASSACHUSETTS WIRELESS EQUIPMENT COMPANY, OF BOSTON, MASSACHUSETTS, A CORPORATION OF NEW YORK.

RECTIFIER.

No. 923,700.     Specification of Letters Patent.     Patented June 1, 1909.

Application filed February 20, 1907. Serial No. 358,493.

*To all whom it may concern:*

Be it known that I, GEORGE W. PIERCE, citizen of the United States, and resident of Cambridge, Middlesex county, Massachusetts, have invented certain new and useful Improvements in Rectifiers, of which the following is a specification.

The invention relates to the rectification of alternating currents and is of special importance in connection with the rectification of comparatively large currents such, for instance, as are employed in charging storage batteries.

In practicing the invention, a comparatively small current from the alternating current source is rectified, or rectified and distorted, and this small current is utilized to control or operate devices which rectify the comparatively large load current.

The rectified, or rectified and distorted, current operates devices to open and close the main, or load, alternating current circuit, synchronously with the phase-recurrences thereof. The current for the controlling circuit is derived from the main alternating source.

The current in the controlling circuit, by which I mean that circuit in which the contrivances for opening and closing the main circuit are operated, is rectified and distorted so that, instead of a zero point, there is a considerable dormant period, when the current is approximately zero, and the current flow is exclusively in one phase, or much more strongly in one phase than in its opposite. For the purpose of producing this rectified and distorted current, I employ in the controlling circuit a contact piece composed of an asymmetrically conductive solid, adapted to rectify small currents, such as carborundum, molybdenite, etc. These asymmetrical conductors are peculiar, in that the current-rise is negligible for considerable rises in potential from the zero point, or phase-axis, on both sides of the axis in case of alternations, and, after a considerable rise in potential, the current rises suddenly from approximately zero to a point commensurate with the potential. The phase-curve of an alternating current rectified and distorted by such a substance is characterized by a horizontal (or nearly horizontal) current line on either side of the phase-axis, and an abrupt apex on one side, with a slight rise on the other side, of the double curve. Owing to these properties and to their durability and reliability they may be more advantageously used than electrolytic or other forms of rectifiers.

The mechanism which is operated or controlled by the rectified, or rectified and distorted, small current may be any suitable form of synchronously operated mechanism operable or controllable by such small current.

For the purpose of illustration I have shown diagrammatically in the accompanying drawings two forms of apparatus embodying the features of my invention.

Figure 2:
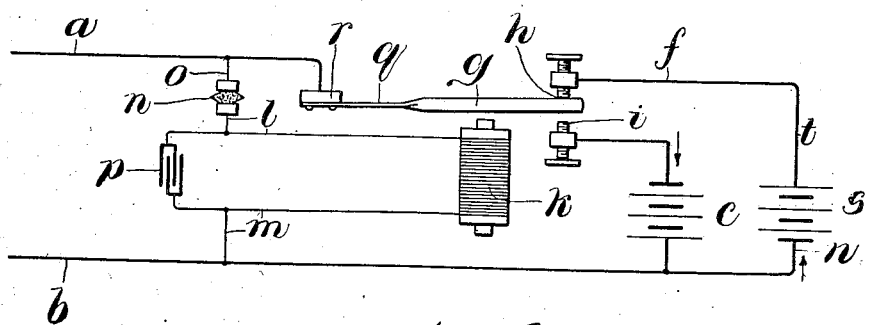

In these drawings Figure 1 is a diagrammatic view illustrating one form of apparatus for rectifying a current from an alternating current source; and Fig. 2 is a similar view illustrating a somewhat modified form of apparatus.

In the apparatus illustrated in Fig. 1 the conductors $a$ $b$ form the leads from an alternating current source and the electric load which is to be supplied with a rectified current from said leads is indicated as a storage battery $c$. This load is in circuit with the lead $b$ through a conductor $d$ and is in circuit with the lead $a$ through conductors $e$ and $f$ and a device for opening and closing the circuit so that passage of current is permitted in one phase only or more strongly in one phase than in the opposite phase. The interrupter-device for opening and closing the circuit comprises an armature $g$ connected with the lead $a$ and arranged to vibrate between two contacts $h$ and $i$. One of the contacts, the contact $i$ as shown, is connected with the conductor $f$ and the other forms a stop for limiting the movement of the armature. A spring $j$ tends to move the armature against the stop.

The vibration of the armature is controlled and effected by a current passing through an electromagnet $k$. This current is supplied from the alternating current source through conductors $l$ and $m$ connecting with the leads $a$ and $b$ respectively. The conductor $l$ connects with the lead $a$ and through a rectifying device $n$ and a conductor $o$. This rectifying device consists of a crystal or lamina of an asymmetrically conductive substance, such as hereinabove described, which permits more current to flow in one phase than in the opposite phase, and chokes all current for a considerable period at either side of the zero point in the alternation.

Now suppose the rectifying device $n$ offers less resistance to the passage of the current in the direction of the arrow than in the opposite direction. The spring $j$ and contact $h$ are so adjusted that the current in the direction of the arrow is sufficient to move the armature $g$ into engagement with the contact $i$, thus closing the circuit and permitting the passage of the current in the direction of the arrow through the load $c$. When, however, the electromotive force of the line diminishes and then reverses, the rectifier $n$ ceases to permit current to pass sufficient to hold the armature $g$ so that during this period of the electromotive force the circuit is open at $i$. Thus the current is allowed to pass through the contact $i$ when the electromotive force of the alternating source is in one direction and is not allowed to pass when the electromotive force is in the opposite direction.

The efficiency of the apparatus may be increased by providing a condenser $p$ of proper capacity connected in shunt about the magnet $k$ for the purpose of modifying the lag of the current in the inductance at $k$ behind the impressed electromotive force. By the use of such a condenser having the proper capacity or so formed that its capacity may be varied to give it the proper capacity the phase of the current in the magnet $k$ may be so adjusted that the make and break of the load circuit at the contact $i$ may occur as nearly as possible at the part of the cycle when the voltage of the circuit has the least tendency to produce sparking at the contact $i$.

Any other suitable or well known method of using condensers and inductances for regulating the phase of the current in the electromagnet circuit with reference to the phase of the current in the load circuit may be employed.

The movable member operated or controlled electromagnetically through the small rectified current may be formed wholly or partly of soft iron or may be a permanent magnet or an electro-magnet.

The movable member may act with a forced vibration under the action of the spring $j$ and the fluctuating current in the electromagnet $k$ as indicated in Fig. 1 or it may be adjusted or formed to vibrate with some appropriate natural period under its own inertia. In the latter case it may be constructed as indicated in Fig. 2 in which the armature is provided with a spring portion $q$ by which it is secured to a support $r$.

The current may be taken off from either the contact $i$ or $h$ or both contacts may be used for different rectified circuits as indicated in Fig. 2. As here indicated the contact $h$ is in circuit with a second load $s$ through a conductor $t$ and the load is connected with the lead $b$ through a conductor $u$. In this case two rectified load currents are supplied from the alternating current source, the two currents flowing in opposite directions.

No attempt has been made to illustrate the mechanical details of the apparatus shown which may be such as is best suited to the conditions under which the invention is to be used.

What I claim and desire to secure by Letters Patent is:

1. In a rectifying apparatus, the combination of a main alternating current line, an interrupter therein, a circuit deriving current from the main circuit, an asymmetrically conductive solid in said derived circuit to rectify and distort the alternating current therein, and devices in said derived circuit to control the interrupter.

2. In a rectifying apparatus, the combination of a main alternating current circuit, an interrupter therein, a circuit deriving current from the main circuit, an asymmetrically conductive solid in said derived circuit to rectify and distort the alternating current therein, and electromagnetic devices in said derived circuit to control the interrupter.

3. In a rectifying apparatus, the combination of a main alternating current circuit, an interrupter therein, a circuit deriving current from the main circuit, an asymmetrically conductive solid in said derived circuit to rectify and distort the alternating current therein, a phase regulator in said derived circuit, and devices in said derived circuit to control the interrupter.

4. In a rectifying apparatus, the combination of a main alternating current circuit, an interrupter therein, a circuit deriving current from the main circuit, an asymmetrically conductive solid in said derived circuit to rectify and distort the alternating current therein, a phase regulator in said derived circuit, and electromagnetic devices in said derived circuit to control the interrupter.

In witness whereof, I have hereunto set my hand, this 11th day of February 1907.

GEORGE W. PIERCE.

In the presence of—
IRA L. FISH,
KATHARINE A. DUGAN.